United States Patent
Baumgartner et al.

(10) Patent No.: US 8,240,438 B2
(45) Date of Patent: Aug. 14, 2012

(54) DISC BRAKE

(75) Inventors: Johann Baumgartner, Moosburg (DE); Tobias Linke, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 761 days.

(21) Appl. No.: 12/282,101

(22) PCT Filed: Feb. 22, 2007

(86) PCT No.: PCT/EP2007/001534
§ 371 (c)(1),
(2), (4) Date: Feb. 6, 2009

(87) PCT Pub. No.: WO2007/101555
PCT Pub. Date: Sep. 13, 2007

(65) Prior Publication Data
US 2009/0321195 A1    Dec. 31, 2009

(30) Foreign Application Priority Data
Mar. 6, 2006  (DE) .......................... 10 2006 010 215

(51) Int. Cl.
*F16D 55/08* (2006.01)
(52) U.S. Cl. .................................... 188/72.7; 188/250 G
(58) Field of Classification Search ................ 188/70 R, 188/70 B, 72.2, 72.7, 72.9, 73.31, 73.47, 188/370, 250 F, 250 G
See application file for complete search history.

(56) References Cited

U.S. PATENT DOCUMENTS

| | | | | |
|---|---|---|---|---|
| 3,285,372 A | * | 11/1966 | Rossmann | 188/72.2 |
| 3,425,519 A | * | 2/1969 | Frigger | 188/72.3 |
| 3,651,897 A | * | 3/1972 | Hahn | 188/72.2 |
| 5,433,298 A | * | 7/1995 | Antony et al. | 188/72.7 |
| 5,433,301 A | | 7/1995 | Eshghy | |
| 5,775,782 A | * | 7/1998 | Akita et al. | 303/10 |
| 6,073,732 A | | 6/2000 | Angerfors | |
| 6,752,247 B2 | * | 6/2004 | Hartsock | 188/72.7 |
| 6,957,723 B2 | * | 10/2005 | Baumann et al. | 188/72.7 |
| 7,000,742 B2 | | 2/2006 | Heinlein | |
| 7,374,026 B2 | * | 5/2008 | Taylor et al. | 188/71.9 |
| 7,552,804 B2 | * | 6/2009 | Baumann et al. | 188/71.8 |

(Continued)

FOREIGN PATENT DOCUMENTS

DE    42 31 560 A1    3/1994

(Continued)

OTHER PUBLICATIONS

International Preliminary Report on Patentability w/English translation (eleven (11) pages).

(Continued)

*Primary Examiner* — Bradley King
*Assistant Examiner* — Nicholas J Lane
(74) *Attorney, Agent, or Firm* — Crowell & Moring LLP

(57) ABSTRACT

A pneumatic disc brake for utility vehicles has two brake pad carrier plates to which brake pads are fixed. The disc brake is equipped with an application device which has two pressure plungers. By way of a force-absorbing connection between the pressure plungers and the facing surface of the brake pad carrier plate, a bridge is relieved of bending stresses. The end faces of the pressure plungers and at least the contact faces of the facing brake pad carrier plate are provided with profilings, which engage into one another in a form-fitting manner, such that at least in the event of full-load braking, each brake pad is moved in the peripheral direction.

8 Claims, 2 Drawing Sheets

U.S. PATENT DOCUMENTS

| | | | |
|---|---|---|---|
| 7,703,581 B1 * | 4/2010 | Charmat | 188/72.2 |
| 7,815,021 B2 * | 10/2010 | Baumgartner et al. | 188/72.9 |
| 7,950,502 B2 * | 5/2011 | Baumgartner et al. | 188/71.9 |
| 2002/0129996 A1 | 9/2002 | Emmet et al. | |
| 2004/0178027 A1 * | 9/2004 | Hartsock | 188/72.7 |
| 2006/0175163 A1 * | 8/2006 | Severinsson | 188/265 |
| 2007/0068747 A1 * | 3/2007 | Barbosa | 188/72.7 |

FOREIGN PATENT DOCUMENTS

| | | | |
|---|---|---|---|
| DE | 197 06 123 A1 | 8/1998 | |
| EP | 1 217 246 A1 | 6/2002 | |
| GB | 1035183 | * | 7/1962 |
| WO | WO 2005/003584 A1 | 1/2005 | |

OTHER PUBLICATIONS

International Search Report dated Apr. 13, 2007, including English translation (Four (4) pages).

* cited by examiner

DISC BRAKE

BACKGROUND AND SUMMARY OF THE INVENTION

The invention relates to a disc brake, preferably to a pneumatically actuated disc brake for utility vehicles. The disc brake includes a brake caliper enclosing a brake disc with brake pads fixed to brake pad carrier plates arranged on both sides of the brake disc. A rotary-mounted brake lever and a brake application device are provided, which are fitted laterally beside the brake disc. The brake application device is equipped with at least two pistons situated transversely in relation to the brake disc and carried in a bridge, the end faces of the pistons being assigned to the opposing brake pad carrier plate and come into contact with the brake pad carrier plate.

The disc brake in question is further equipped with a brake cylinder, which in a braking sequence transmits a force to the brake lever. Carried in the bridge are threaded spindles, which at their ends assigned to the brake disc carry the pistons. These threaded spindles serve to adjust the lifting clearance of the brake, so as to compensate for brake pad wear.

In the case of the known disc brake, it has proved advantageous if the pistons in a braking sequence bear against the opposing face of the brake pad carrier plate with the greatest possible frictional force, since tangential forces are then absorbed, thereby relieving the bridge of bending stresses through such contact between the pistons and the opposing faces of the brake pad carrier plates. The smooth contact faces, however, mean that such relief is relatively slight, making the reduction achieved in the bending stresses acting on the bridge negligible.

The object of the invention is to design a disc brake such that, in the process of braking, the bending forces acting on the bridge are significantly reduced, while nevertheless ensuring that the brake pad is supported on the brake pad carrier plate, due to the tangentially acting forces.

According to the invention, the end faces of the pistons and at least the contact faces of the opposing brake pad carrier plate are provided with positively intermeshing (form-fitting) profiles, such that each brake pad is displaceable in a peripheral direction, at least in full-load braking. Such "profiles" might also be referred to as ramps. The profiles in the end faces of the pistons and the profiles in the opposing face of the brake pad carrier plate are of complementary design. In addition, they are designed, in their orientation and inclination, so that tangential forces are, to a desired extent, absorbed by the pistons, and that the peripheral displacement of each brake pad is still sufficient to allow it to bear against the brake pad carrier plate horn. The profiles are, moreover, designed so as to limit the maximum tangential force to be absorbed by the pistons.

The solution according to the invention further ensures that a feed movement of the brake pad in its actuating direction is performed due to the peripheral displacement of the brake pad in the profiles or in the ramps. In this way a limited use is made of a self-energizing (intensifying) effect, so as to compensate for a part of the expansion of the brake caliper.

In order to preclude rattling noises and the like from occurring, the end faces of the pistons and the contact faces of the opposing brake pad carrier plate intermesh without any play. It is particularly advantageous here, not least with a view to manufacturing precision, if the intermeshing profiles can be geometrically defined. Thus, in a preferred embodiment, the profiles of the end faces of the pistons and the profiles of the corresponding areas of the opposing face of the brake pad carrier plate consist of grooves and lands engaging in the grooves, which are arranged constantly alternating with one another.

For example, the grooves may have triangular-shaped cross sections. The cross sections here can then be uniform or irregular. The exact design shape is determined by the coefficient of friction of the brake pad. The angles of inclination may be between 15° and 40°, according to the coefficient of friction of the brake pad. These angles advantageously lie between 20° and 30°, assuming a coefficient of friction of the brake pad of 0.375.

The disc brake is appropriately designed so that the possible displacement travel of the brake pad in a peripheral direction is preferably limited, so that the feed travel of the brake pad obtained over the profiles cannot exceed the size of the lifting clearance. This ensures that the brake is perfectly releasable, regardless of the friction ratios on the brake pad and the profiles.

BRIEF DESCRIPTION OF THE DRAWINGS

The invention will be explained in more detail with reference to the drawing attached, in which.

DETAILED DESCRIPTION OF THE DRAWINGS

Figure 1:
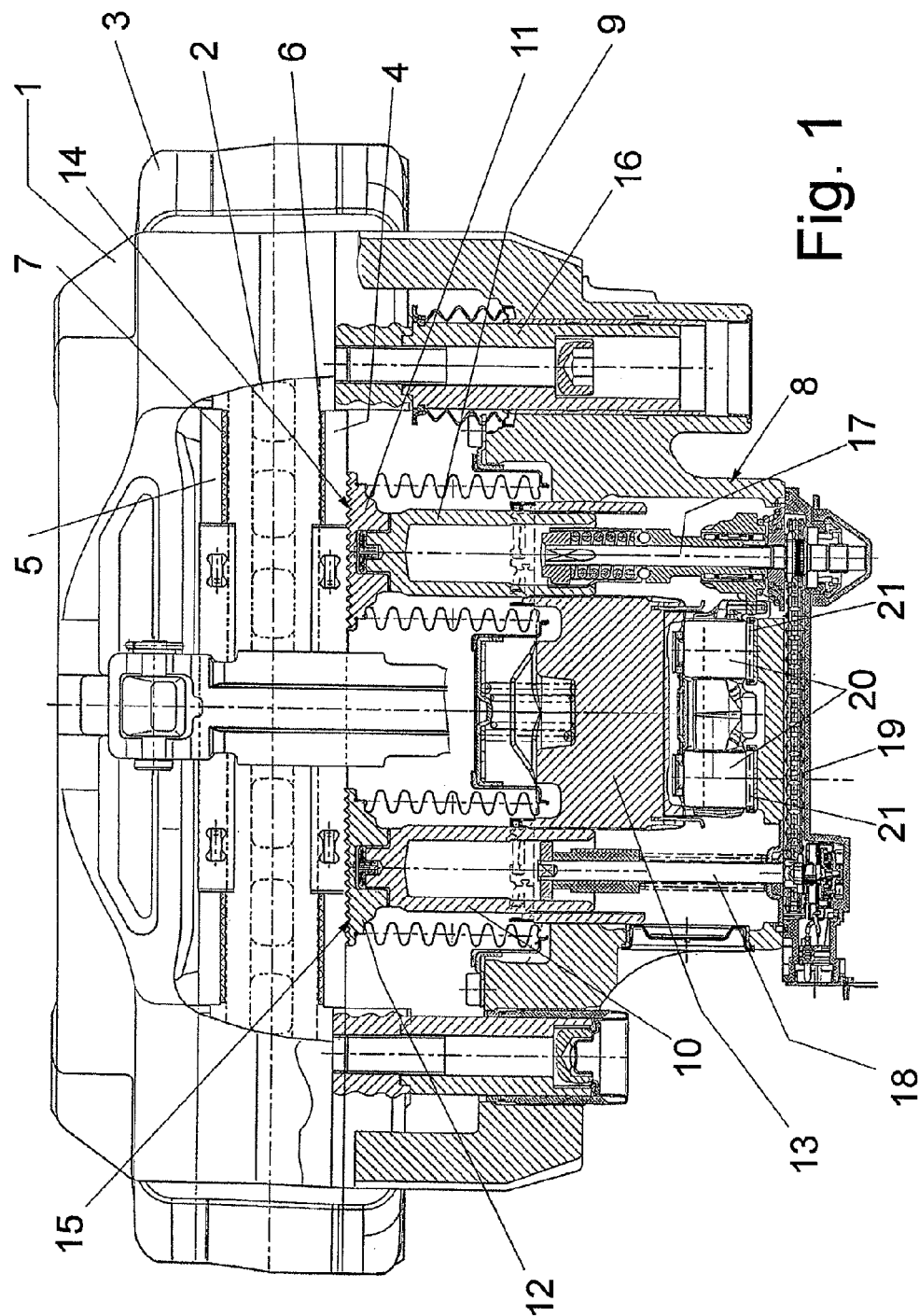
FIG. 1 is a partially sectional view of a disc brake according to the invention, but without a brake cylinder.

The disc brake represented in FIG. 1 is equipped with a brake caliper 1, which encloses a brake disc 2. The disc brake is, moreover, also equipped with a brake carrier 3. Brake pad carrier plates 4, 5 are arranged on both sides of the brake disc 2. The brake pads 6, 7 are fixed to the brake pad carrier plates 4, 5 on the side facing the brake disc 2. The disc brake is further equipped with a brake application device 8, which is known in the art and serves to compensate for wear of the brake pads 6, 7. In the exemplary embodiment shown, the brake application device 8 is equipped with two threaded spindles 9, 10, offset in relation to one another by an angle of 180°. Pistons or pressure plates 11, 12 are mounted on the ends facing the brake disc 2. While the threaded spindles 9, 10 are rotatable for adjustment of the brake pads 6, 7, the pistons 11, 12 are moveable only in the longitudinal axial direction of the threaded spindles 9, 10 and/or the threaded spindles 9, 10 can perform a rotational movement relative to the pistons 11, 12. The threaded spindles 9, 10 are fitted in a bridge 13.

Figure 2A:
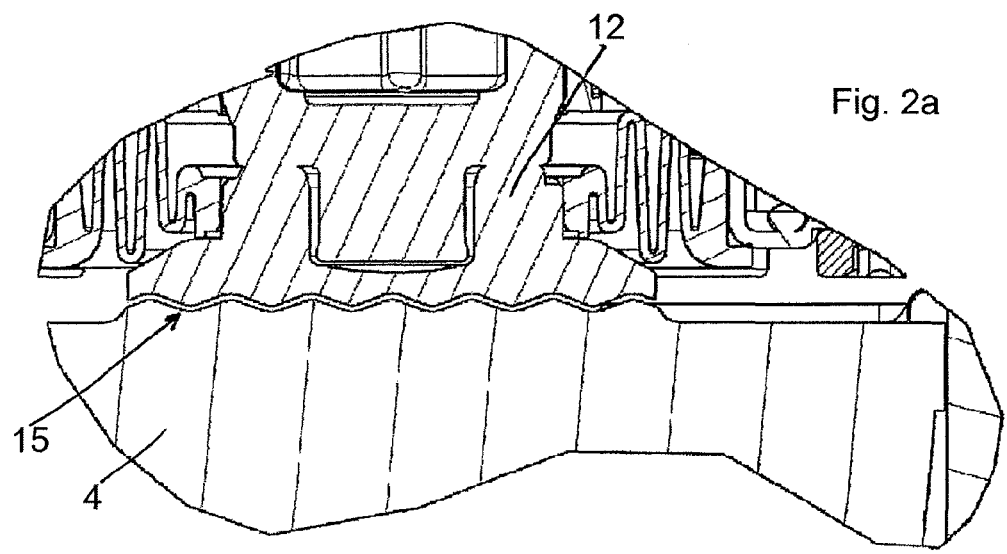
FIGS. 2a and 2b are enlarged exploded views illustrating the intermeshing profiles between the brake pad carrier plate and piston contact faces in the non-operated and operated states, respectively.
Figure 2B:
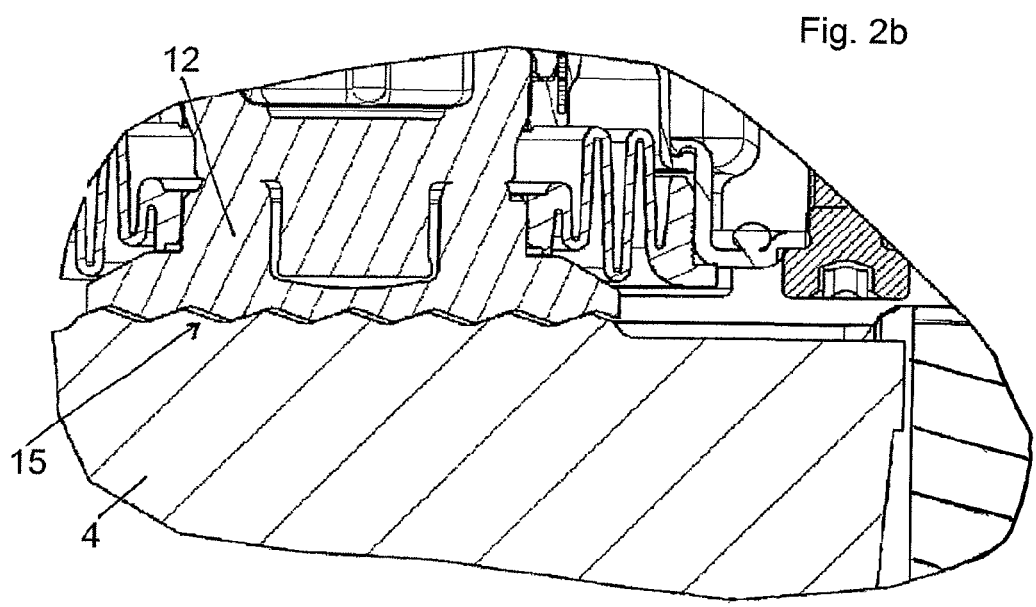

As shown in FIG. 1, the contact faces of the pistons 11, 12 and those of the opposing brake pad carrier plate 4 are profiled, so that they intermesh positively (form-fitting) in one another. In the exemplary embodiment shown the profiles 14, 15 consist of grooves and lands of a generally triangular cross-section, which constantly alternate with one another. The profiles 14, 15 are designed so that they intermesh without any play. FIG. 2a is an enlarged exploded view of the profiles 15 when the brake is in a non-operated state. FIG. 2b is an enlarged exploded view of the profile 15 in the operated state, wherein the slopes of the piston 12 and pad carrier plate 4 are in contact on one side corresponding to the rotating direction of the brake disc. The slopes can be seen to be slightly displaced in the rotating direction of the brake disc (compare FIGS. 2a and 2b).

In the exemplary embodiment shown, the flanks of the profiles stand at the same angle to the non-profiled face of the brake pad carrier plate 4. In contrast to the embodiment represented, this flank angle or the ramp angle might also stand at an angle of between 15° and 40° to the remainder of the face of the brake pad carrier plate 4. Ideally, the angle lies between 20° and 30°, assuming however that the coefficient of friction of the brake pad 6 is in the order of 0.375. The profiles 14, 15 serve to substantially reduce bending stresses acting on the bridge 13, at least in full-load braking. This can be attributed to the fact that tangential forces can be absorbed by the pistons 11, 12.

The brake is moreover also equipped with a bearing 16 for the brake caliper 1. The brake application device 8 is also equipped with a wear adjuster 17, a driver 18, and a synchronizing chain 19. The brake lever is identified by the reference numeral 20, FIG. 1 showing that it is supported by roller bearings 21. When a braking sequence is triggered, the brake cylinder acts on the brake lever 20 in a manner not shown.

The invention is not limited to the exemplary embodiment shown. It is only important that the opposing faces of a brake pad carrier plate 4 positively interlock or intermesh with the faces of the pistons 11, 12, so that the pistons 11, 12 can absorb tangential forces.

The invention claimed is:

1. A disc brake having a brake disc, comprising:
   a brake caliper enclosing the brake disc;
   brake pads fixed to brake pad carrier plates, one brake pad being arranged on each side of the brake disc;
   a rotary brake lever; and
   a brake application device, which is fitted laterally beside the brake disc and which is equipped with at least two pistons situated transversely in relation to the brake disc and carried in a bridge, end faces of said pistons being assigned to an opposing one of the brake pad carrier plates and coming into contact with the opposing brake pad carrier plate;
   wherein the end faces of the pistons and at least contact faces of the opposing brake pad carrier plate are provided with positively intermeshing profiles of alternating grooves and lands such that the opposing brake pad is displaceable in a peripheral direction,
   wherein angles of inclination or ramp angles of the grooves and lands stand at an angle of between 15° and 40° to a face of the respective pistons and brake pad carrier plate having the profiles, and
   wherein a coefficient of friction of the brake pad with respect to the brake disc is approximately 0.375.

2. The disc brake according to claim 1, wherein the profiles of the brake pad carrier plate and the two pistons intermesh without any play.

3. The disc brake according to claim 1, wherein the grooves and the lands of the profiles are of triangular cross sectional design.

4. The disc brake according to claim 1, wherein the angles of inclination or ramp angles of the profiles stand at an angle of between 20° and 30° to the face of the brake pad carrier plate having the profiles.

5. The disc brake according to claim 1, wherein a feed travel of the brake pad obtainable over the profiles does not exceed a size of a lift clearance of the disc brake.

6. A disc brake having a brake disc, comprising:
   a caliper which, in use, straddles the brake disc;
   first and second brake pads, one brake pad being arranged on each side of the brake disc;
   a brake application device arranged in the caliper, the brake application device comprising at least two pistons selectively pressable against one of the respective brake pads, said pistons being carried in a bridge of the brake application device and being laterally spaced apart from one another;
   wherein end faces of the pistons and contact faces of an opposing one of the first and second brake pads are profiled so as to engage in one another in a form-fitting manner, whereby at least in an event of full-load braking, the respective brake pad is displaceable in a peripheral direction;
   wherein the profiles comprise grooves and lands, the grooves and lands alternating with one another;
   wherein angles of inclination of the grooves and lands are between 15° and 40° relative to a face of the brake pad; and
   wherein the brake pad has a coefficient of friction relative to the brake disc of approximately 0.375.

7. The disc brake according to claim 6, wherein the profiles are geometrically defined and engage in one another without any play.

8. The disc brake according to claim 6, wherein the grooves and lands have a triangular-shaped cross section.

\* \* \* \* \*